(12) United States Patent
Ugolini

(10) Patent No.: US 8,899,063 B2
(45) Date of Patent: Dec. 2, 2014

(54) MACHINE FOR PRODUCTS SUCH AS ICE CREAMS, GRANITA OR FROZEN BEVERAGES

(75) Inventor: Marco Corrado Ugolini, Milan (IT)

(73) Assignee: Ugolini SpA (IT)

( * ) Notice: Subject to any disclaimer, the term of this patent is extended or adjusted under 35 U.S.C. 154(b) by 70 days.

(21) Appl. No.: 13/353,631

(22) Filed: Jan. 19, 2012

(65) Prior Publication Data

US 2012/0234035 A1 Sep. 20, 2012

(30) Foreign Application Priority Data

Jan. 21, 2011 (IT) .................................. MI11A0057

(51) Int. Cl.
*A23G 9/00* (2006.01)
*F25C 1/18* (2006.01)
*A23G 9/04* (2006.01)

(52) U.S. Cl.
CPC ...................................... *A23G 9/045* (2013.01)
USPC ................................................ 62/342; 62/69

(58) Field of Classification Search
CPC ........... A23G 9/04; A23G 9/045; A23G 9/86; A23G 9/10; A23G 9/224; F25C 1/18
USPC ...................................................... 62/342, 69
See application file for complete search history.

(56) References Cited

U.S. PATENT DOCUMENTS

| | | |
|---|---|---|
| 1,978,176 A | 10/1934 | Steenstrup |
| 2,619,808 A | 12/1952 | Baird |
| D184,325 S | 1/1959 | Walsh |
| D192,846 S | 5/1962 | Wildman |
| 3,159,007 A | 12/1964 | Rahauser |
| D217,650 S | 5/1970 | Lofgren |
| D218,069 S | 7/1970 | Cornelius |

(Continued)

FOREIGN PATENT DOCUMENTS

| | | |
|---|---|---|
| EP | 0799575 A1 | 10/1997 |
| EP | 0876765 A2 | 11/1998 |

(Continued)

OTHER PUBLICATIONS

"Search Report and Written Opinion, including English translation, dated Sep. 9, 2011 for Italian Application No. MI20110057, from which the instant application is based," 7 pgs.

(Continued)

*Primary Examiner* — Cheryl J Tyler
*Assistant Examiner* — Elizabeth Martin
(74) *Attorney, Agent, or Firm* — Fredrikson & Byron, P.A.

(57) ABSTRACT

A machine for producing products such as ice cream, frozen beverages or granita. An example of the machine comprises a tank with a tap for dispensing a product. A cylinder with a substantially horizontal axis projects from a rear wall inside the tank. The cylinder forms the evaporator of a refrigerating circuit. A mixer element around the cylinder rotates coaxially with the cylinder axis. A motor unit is connected to the mixer element via a drive shaft passing along the axis of the cylinder. The drive shaft connects to the mixer element at one end of the cylinder opposite the rear wall. The motor unit comprises a final reduction stage in alignment with the cylinder axis, a motor arranged at an angle with respect to the cylinder axis and substantially parallel to the rear wall, and an angular drive between the final reduction stage and the motor.

12 Claims, 3 Drawing Sheets

(56) References Cited

U.S. PATENT DOCUMENTS

| | | | |
|---|---|---|---|
| D218,082 S | 7/1970 | Cornelius | |
| D223,185 S | 3/1972 | Hartley | |
| D223,648 S | 5/1972 | Hartley | |
| D223,890 S | 6/1972 | Hartley | |
| 3,695,051 A * | 10/1972 | Hunt | 62/136 |
| 3,995,770 A * | 12/1976 | Schwitters | 222/56 |
| D251,432 S | 3/1979 | Sawada | |
| D251,847 S | 5/1979 | Carvel | |
| D261,890 S | 11/1981 | Caspersen | |
| 4,522,041 A | 6/1985 | Menzel | |
| 4,575,255 A | 3/1986 | Kafka | |
| 4,586,826 A | 5/1986 | Uesaka | |
| 4,664,529 A | 5/1987 | Cavalli | |
| 4,669,274 A * | 6/1987 | Huang | 62/342 |
| 4,674,886 A | 6/1987 | Uesaka | |
| 4,736,593 A | 4/1988 | Williams | |
| 4,736,600 A * | 4/1988 | Brown | 62/342 |
| 4,900,158 A | 2/1990 | Ugolini | |
| 4,910,973 A | 3/1990 | Osrow | |
| 5,363,746 A | 11/1994 | Gordon | |
| D378,215 S | 2/1997 | Gander | |
| 5,713,214 A | 2/1998 | Ugolini | |
| 5,906,105 A * | 5/1999 | Ugolini | 62/136 |
| 6,082,123 A | 7/2000 | Johnson | |
| 6,095,677 A | 8/2000 | Karkos, Jr. | |
| 6,163,095 A | 12/2000 | Shams | |
| 6,220,047 B1 * | 4/2001 | Vogel et al. | 62/342 |
| 6,267,049 B1 | 7/2001 | Silvano | |
| 6,349,852 B1 | 2/2002 | Ford | |
| 6,438,987 B1 * | 8/2002 | Pahl | 62/342 |
| D466,138 S | 11/2002 | Baldonado | |
| D485,566 S | 1/2004 | Ledingham | |
| D535,668 S | 1/2007 | Moore | |
| 7,603,870 B2 * | 10/2009 | Mavridis et al. | 62/136 |
| D651,619 S | 1/2012 | Salin | |
| D662,526 S | 6/2012 | Tulisi | |
| D667,675 S | 9/2012 | Bouwknegt | |
| D671,568 S | 11/2012 | Pelayo | |
| D671,963 S | 12/2012 | Pelayo | |
| D685,399 S | 7/2013 | Pelayo | |
| 2008/0016893 A1 | 1/2008 | Hayase | |
| 2008/0098765 A1 | 5/2008 | Bond | |

FOREIGN PATENT DOCUMENTS

| | | |
|---|---|---|
| EP | 1262724 A2 | 12/2002 |
| EP | 1459666 A1 | 9/2004 |
| EP | 1477455 A1 | 11/2004 |
| ES | 2166248 A1 | 4/2002 |
| JP | 1179653 A | 7/1989 |
| JP | 11253105 | 9/1999 |
| WO | 03082022 A1 | 10/2003 |

OTHER PUBLICATIONS

PCT International Search Report dated Jul. 25, 2011 for PCT/IB2011/052085, 4 pages.

PCT International Search Report dated Jan. 13, 2012 for PCT/IB2011/053245, 3 pages.

PCT International Search Report and Written Opinion dated Feb. 1, 2012 for PCT/IB2011/053804, 7 pages.

Italian Search Report and opinion dated Mar. 2, 2011 for Italian Application MI201001262, 8 pages.

Italian Search Report and Written Opinion dated Jul. 11, 2011 for related IT application MI20102357, 7 pages.

* cited by examiner

MACHINE FOR PRODUCTS SUCH AS ICE CREAMS, GRANITA OR FROZEN BEVERAGES

CROSS-REFERENCE

This application claims the benefit of Italian Patent Application No. MI2011A 000057, filed Jan. 21, 2011, the content of which is hereby incorporated by reference in its entirety.

BACKGROUND

The present invention relates to a machine for producing and dispensing products such as ice creams, granita or frozen beverages, of the type comprising a tank for the product, which contains a cooling evaporation cylinder around which a motor-driven mixer element rotates.

Usually, in machines of the prior art the mixer element is operated by a shaft which passes through the rear wall of the tank axially with respect to the evaporation cylinder so as to reach a motor unit or gearmotor which is arranged in the rear part of the machine, behind the product tank. Usually the motor of the gearmotor has an axis which is parallel to the axis of the cylinder. The rear part of the machine is therefore very deep since it must contain the gearmotor.

In an attempt to reduce the overall dimensions, in the prior art machines have been proposed where the gearmotor has a gear train arranged so as to extend substantially vertically (namely in a direction transverse to the axis of rotation of the mixer element and the motor), for example with a gear train which displaces the axis of the motor downwards with respect to the axis of the mixer. In some known solutions, the axis is displaced such that the motor may be housed underneath the tank. This, however, results in the motor occupying the space in the bottom of the machine where the refrigerating circuit of the machine is also housed. This results in the need for a larger sized base and represents a constraint for arrangement of the parts of the refrigerating circuit.

A further disadvantage is that the gear train used is per se bulky and, often, noisy.

SUMMARY

A general object of the present invention is to provide a machine of the abovementioned type, but with a reduction in the volume occupied by the motor unit. A further object is to provide a machine which has a lower noise level. Yet another object is to obtain a machine with a motor unit which is a compact unit which can be easily disassembled and replaced.

In view of the general object the idea which has occurred according to the invention is to provide a machine for producing and dispensing products such as ice cream, frozen beverages or granita, comprising a product-containing tank which is provided with a tap for dispensing the product and inside which there projects from a rear wall a cylinder with a substantially horizontal axis which forms the evaporator of a refrigerating circuit of the machine for cooling the product in the tank, a mixer element for stirring the product being present around the cylinder so as to rotate coaxially with the axis of the cylinder by means of a motor unit, which is arranged outside the tank and which rotates the mixer element by means of a drive shaft with an axis which passes along the axis of the cylinder and which is connected to the mixer element at one end of the cylinder which is opposite to the rear wall, characterized in that the motor unit comprises a final reduction unit arranged coaxial with the drive shaft and an electric motor which projects laterally with its axis substantially transverse to the axis of the drive shaft, the final reduction unit and motor being interconnected by means of an angular transmission stage.

BRIEF DESCRIPTION OF THE DRAWINGS

In order to illustrate more clearly the innovative principles of the present invention and its advantages compared to the prior art, an example of an embodiment applying these principles will be described below, with the aid of the accompanying drawings. In the drawings.

DETAILED DESCRIPTION OF THE PREFERRED EMBODIMENTS

Figure 1:
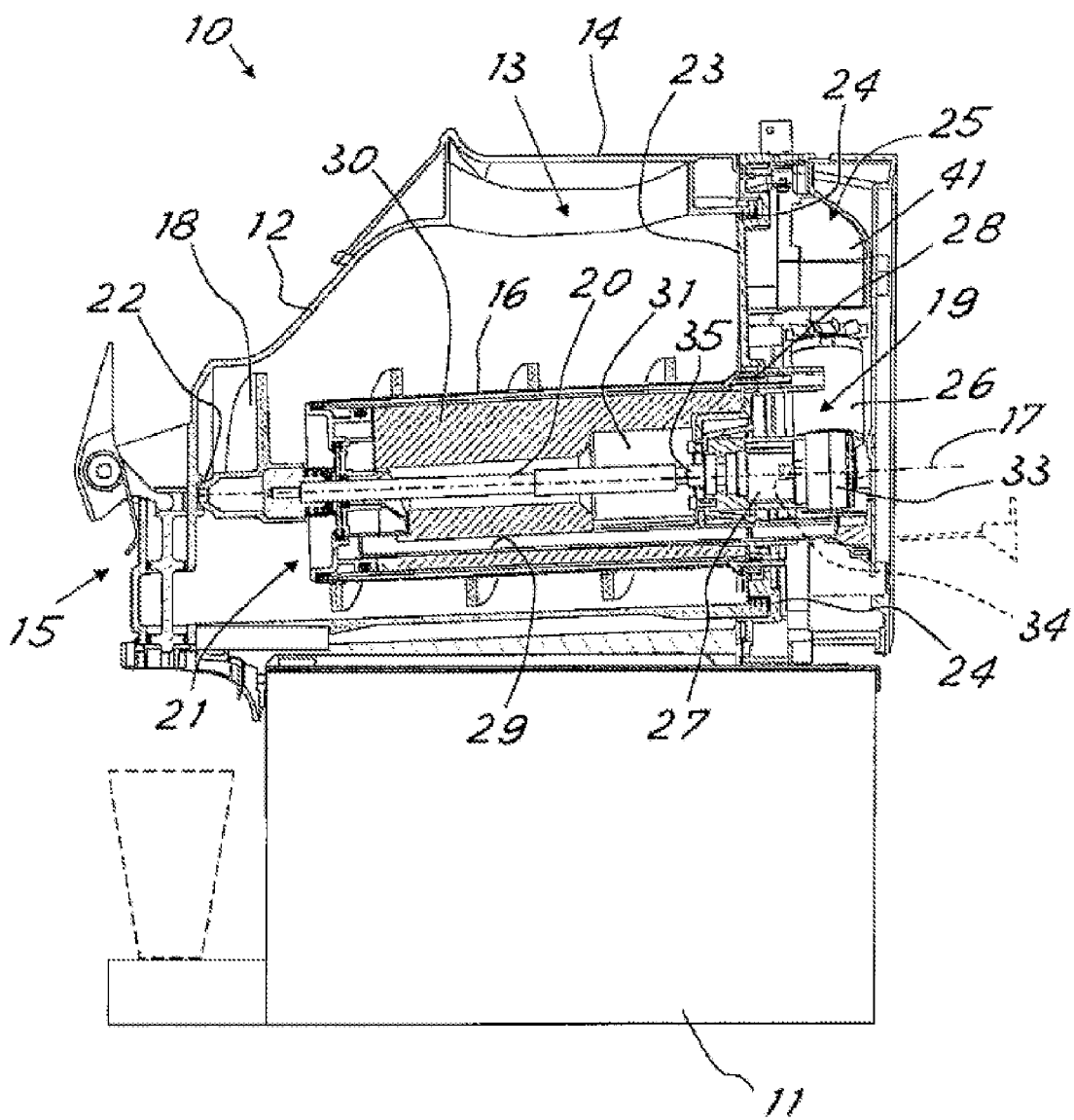
FIG. 1 shows a partially cross-sectioned, schematic, side elevation view of a machine according to an embodiment of the invention.

With reference to the figures, these show a machine, denoted generally by 10, for producing and dispensing ice creams, frozen beverages, granita and the like.

The machine 10 comprises a base 11 on which a tank 12 is mounted, the tank being usually made of transparent plastic and provided with a top opening 13 which is advantageously closed by a lid 14 fitted with a key and having a front tap 15 for controlled dispensing of the product.

The tank 12 has inside it an evaporator 16 of a refrigerating circuit (of the known type and therefore not described or shown in detail), the other parts of which are advantageously contained in the base 11. The evaporator is in the form of a hollow cylinder with a substantially horizontal axis 17 and projects into the tank from an end wall 23.

Inside the tank there is a mixer element 18 which is in the form of a cylindrical helix which surrounds the evaporator cylinder 16 and rotates coaxially therewith by means of a motor unit 19 situated outside the tank and connected to the mixer element 18 by means of a shaft 20 which passes through the cylinder along the axis 17 and enters into the tank, via seals 21, at the free front end of the cylinder 16. Advantageously, the mixer element rests with its end against a seat 22 formed in the inner wall of the tank at the front of the free end of the cylinder. The mixer element is of the type known per se intended simultaneously to mix up the product, assist formation and dispensing thereof and prevent the formation of incrustations on the outer wall of the cooling cylinder.

Again advantageously, the tank is connected to the end wall 23 in a removable manner by means of seals 24 so that the end wall 23 (vertically projecting from the base 11) also forms a fixed rear closing wall of the tank. A closed space 25 is formed behind the end wall 23 for machine parts, such as electronic control boards, etc.

The evaporator cylinder 16 is sealed off from the product inside the tank by means of a seal 28, situated along the connection between the cylinder and rear wall 23, and the front seals 21. This also ensures that the various parts of the machine may be disassembled, as can be easily imagined by the person skilled in the art.

Figure 2:
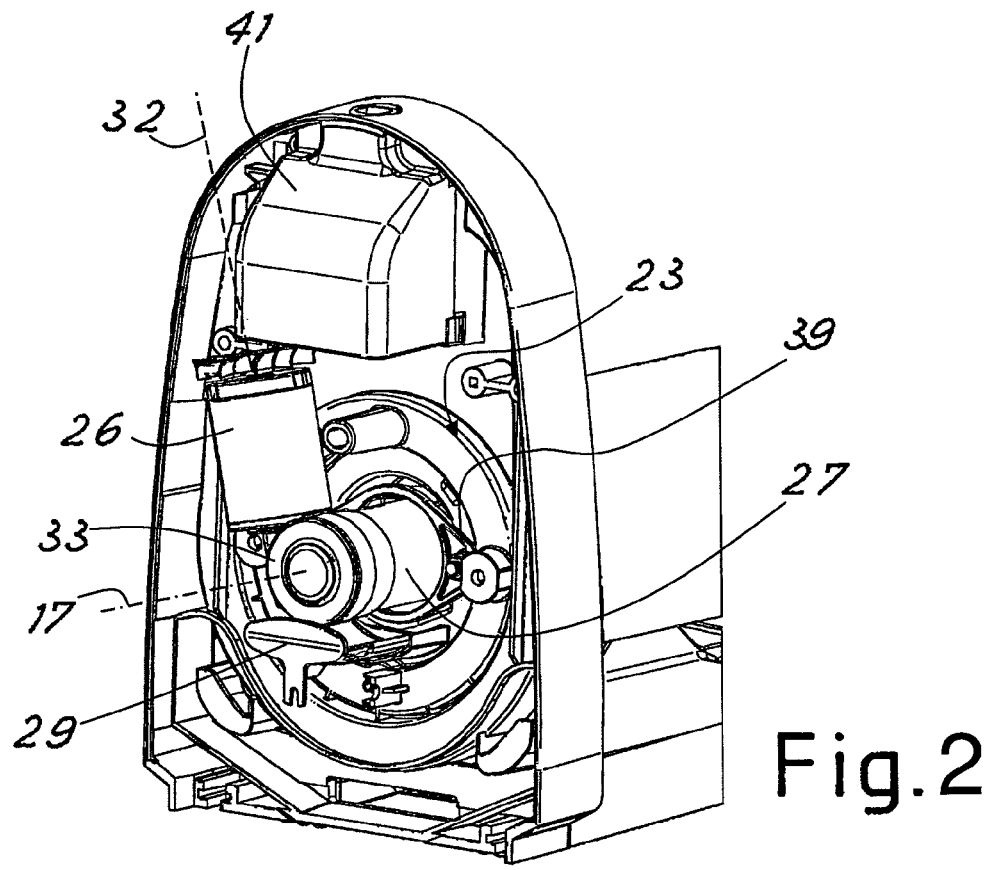
FIG. 2 shows a partial and perspective view of a rear part of the machine according to FIG. 1.

As can be clearly seen also in FIG. 2, the motor unit 19 comprises a final reduction stage 27, which is coaxial with the drive shaft 20 and with which, therefore, it has a common axis 17, and an electric motor 26 which projects laterally with an axis 32 substantially transverse to the axis of the drive shaft, the final reduction stage and motor being interconnected by an angular transmission stage 33. In particular, the two axes 17 and 32 are advantageously arranged skew and therefore do not lie in the same plane. Advantageously, the electric motor 26 is arranged with its axis substantially parallel to the rear wall and is directed preferably with its rear part upwards.

The final reduction stage 27 is advantageously designed with an input 34 and output 35 which are coaxial with the axis 17 and by means of an epicyclic reducer 27 (of the type known per se and therefore not illustrated in detail). The angular transmission stage 33 is advantageously an angular speed reducer. This optimizes the dimensions of the system, resulting in a reduction in the number of revolutions so that an epicyclic reducer with a small number of stages (for example one or, advantageously, two stages) may be obtained. It has been found that this reduces the costs and the noisiness of the motor unit.

Figure 3:
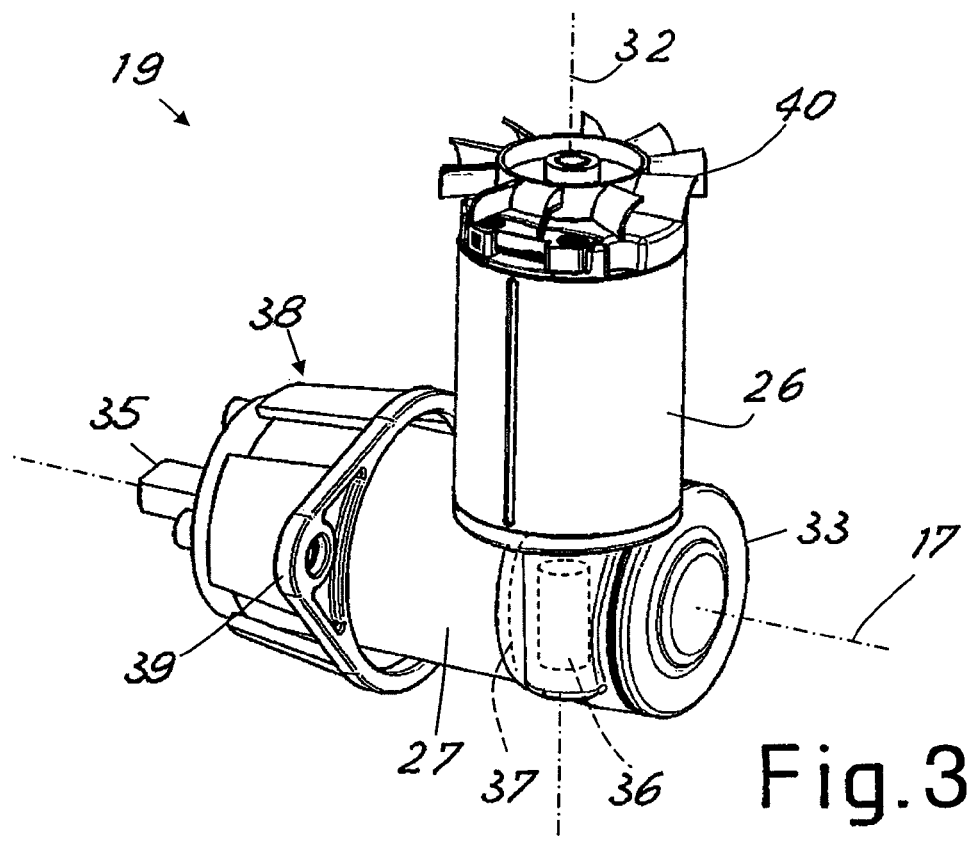
FIGS. 3, 4 and 5 show, respectively, a perspective view, side view and view with parts removed of a gearmotor unit of the machine according to FIG. 1.
Figure 5:
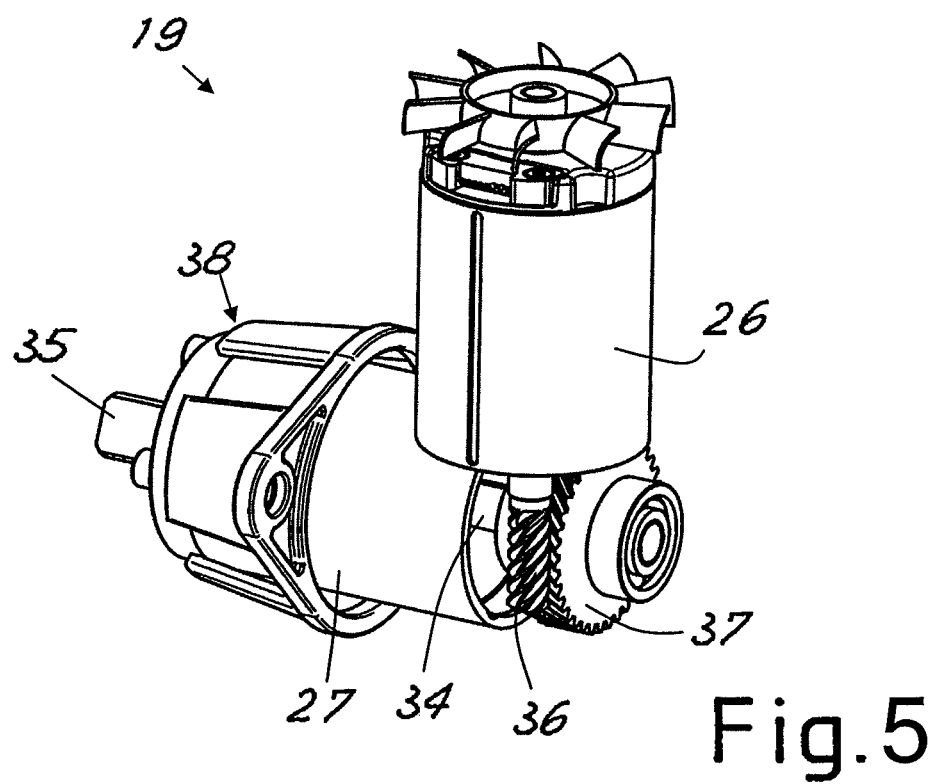

As is shown schematically in broken lines in FIG. 3, the angular transmission stage 33 comprises advantageously an input worm 36 which is connected coaxially with the shaft of the motor and engages with an output crown gear 37 connected to the input 34 of the reducer 27. However, a bevel gear pair may also be used. As can be seen in the cut-away view of FIG. 5, it has been found to be particularly advantageous to form the angular drive by means of parts comprising inclined or helical teeth so as to ensure greater efficiency and a lower noise level.

The electric motor may be of the brushless type for a more advantageous size/power ratio and better electronic control of the speed during the various product preparation and dispensing phases.

Advantageously, the motor unit 19 may also be at least partially housed inside the evaporator cylinder 16 via the rear wall 23.

In particular, the inner wall of the cylinder 16 is preferably lined with a layer 30 of heat-insulating material having, formed therein, a seat 31 for the output end of the motor unit and for receiving the coaxial drive shaft 20.

Advantageously, the front end of the final stage 27 may be housed inside the cylinder so as to reduce the amount by which the motor unit projects at the rear.

This allows a further reduction in the level of the noise perceived externally.

Advantageously, inside the cylinder and in a position below the axis 17 and the motor unit 19, there is a tray 29 (extractable towards the rear of the machine as shown in broken lines) for collecting liquid which could form, for example as a result of condensation or seepage, inside the cylinder.

Figure 4:
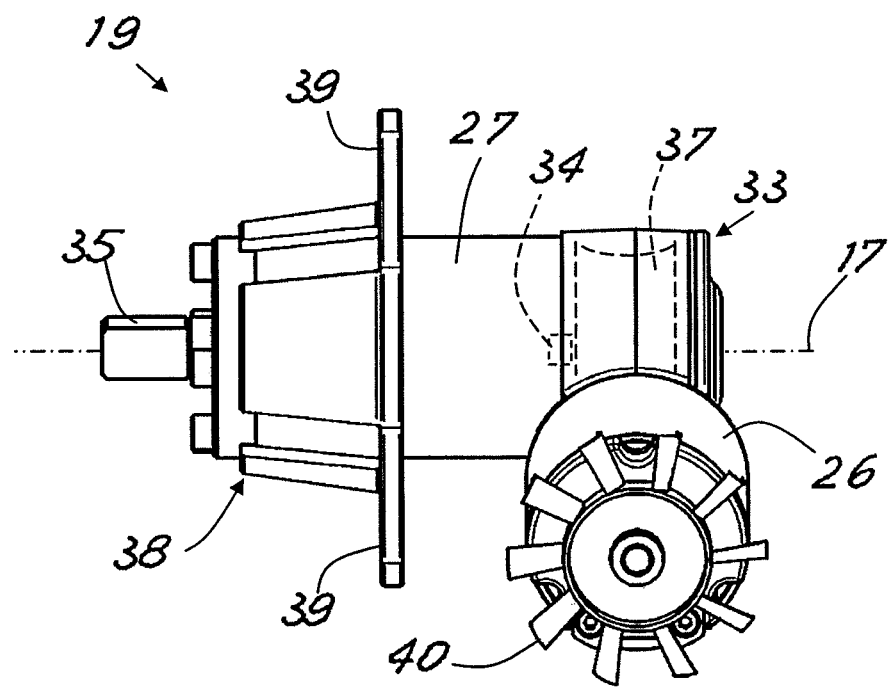

Preferably the motor unit is fixed so as to project from the wall 23. As can be seen more clearly in FIG. 2 and in FIGS. 3 and 4, at the front end of the final stage 27 there is a cup-shaped element (preferably made of plastic) which receives and is fixed to the front end of the motor unit and which has flanges 39 for fixing the motor unit to the wall.

By means of a facetted connector on the output 35 of the motor unit, designed to engage in a matching seat on the rear of the drive shaft 20, it is possible to perform easy assembly and disassembly of the entire motor unit by simply tightening/loosening the screws which fix the flanges 39.

Advantageously, the motor has a rear part which is directed upwards and which is provided with a fan 40 which rotates so as to blow at least partially into an air conveyor 41 which conveys the air towards the top of the tank in order to emit an air flow onto the outer wall of the tank. This flow reduces the condensation on the outer walls of the tank, improving the visibility and appearance of the product.

At this point it is clear how the predefined objects have been achieved. By using an angled motor unit as described, the overall dimensions are reduced, the performance is improved and the mechanical structure is simplified. The motor unit is substantially a compact single-piece unit which can be easily disassembled and replaced when needed. Moreover, by using the space inside the evaporator cylinder to contain at least part of the motor unit the rear dimension of the machine behind the tank can be further reduced. The space freed at the rear may be used both to house other parts of the machine and to provide a machine having a smaller depth of the part behind the tank. This enables the overall dimensions of the machine to be optimized with respect to the capacity of the tank.

Moreover, the base remains fully available for the other parts of the machine and, in particular, the refrigerating unit. Compared to the other solutions, the noise level of the speed reducer is reduced even though a high reduction ratio may be achieved. In particular, by using an epicyclic reducer and an angular reducing drive, it is possible to limit the cost and reduce the noisiness which is typical of epicyclic reducers, decreasing the number of epicyclic stages required. Owing to the structure according to the invention, the total reduction in the number of revolutions may be easily even higher than 1:100, for example in the region of 1:150, with the two epicyclic stages having a reduction ratio of 1:5 each and angular drive with a reduction ratio of 1:6. The motor may thus have smaller dimensions.

Obviously, the above description of an embodiment applying the innovative principles of the present invention is provided by way of example of these innovative principles and must therefore not be regarded as limiting the scope of the rights claimed herein. For example, the exact form and proportions of the various parts of the machine may be varied depending on the specific technical and aesthetic requirements.

What is claimed is:

1. A machine for producing and dispensing a product including, or similar to, ice cream, a frozen beverage or granita, the machine comprising:
   a tank for containing the product, the tank provided with a tap for dispensing the product, wherein inside the tank there projects from a rear wall a cylinder which has a substantially horizontal axis and which forms an evaporator of a refrigerating circuit of the machine for cooling the product in the tank;
   a mixer element for stirring the product, the mixer element having a rotation axis, the mixer element being present around the cylinder so as to rotate coaxially with the axis of the cylinder;
   a motor unit arranged outside the tank which rotates the mixer element using a drive shaft with an axis which passes along the axis of the cylinder and which is connected to the mixer element at one end of the cylinder which is opposite to the rear wall, the drive shaft being coaxial to the rotation axis of the mixer element, wherein the motor unit comprises:
      a final speed reduction stage arranged coaxial with both the drive shaft and the rotation axis of the mixer element, the final speed reduction stage comprising a input shaft and a output shaft which have rotation axes parallel to each other and with the drive shaft and a speed reduction rate from the input shaft to the output shaft, the output shaft being coaxial with the rotation axis of the mixer element and connected to the drive shaft;

an electric motor having a shaft, wherein the electric motor projects laterally with the axis of the electric motor shaft substantially transverse to the axis of the drive shaft; and an angular transmission stage interconnecting the input shaft of the final speed reduction stage and the shaft of the electric motor.

2. The machine according to claim 1, wherein the motor unit is at least partially housed inside the cylinder through the rear wall.

3. The machine according to claim 1, wherein the electric motor is arranged with the axis of the electric motor shaft substantially parallel to the rear wall.

4. The machine according to claim 1, wherein the inner wall of the cylinder is lined with a layer of heat-insulating material in which a seat is formed for an output end of the motor unit and for receiving the coaxial drive shaft.

5. The machine according to claim 1, wherein the angular transmission stage comprises an input worm which engages with an output crown gear.

6. The machine according to claim 1, wherein the final reduction stage comprises an epicyclic reducer.

7. The machine according to claim 6, wherein the epicyclic reducer is a two-stage epicyclic reducer.

8. The machine according to claim 1, wherein the angular transmission stage is an angular speed reducer.

9. The machine according to claim 1, wherein the motor unit comprises flanges projecting laterally from the final reduction stage for fixing thereof in the machine.

10. The machine according to claim 1, wherein the motor has a rear part, the rear part of the motor directed upwards and provided with a rotating fan which blows at least partially into an air conveyor which emits an air flow onto the outer wall of the tank.

11. The machine according to claim 1, wherein the speed reduction rate between the input shaft and the output shaft equals a first speed reduction ratio.

12. The machine according to claim 1, wherein the angular transmission stage comprises an input and an output, the input of the angular transmission stage being coaxial with the electric motor shaft, the output of the angular transmission stage being connected to the input of the final reduction stage.

* * * * *